US009619505B2

(12) United States Patent
Yara et al.

(10) Patent No.: US 9,619,505 B2
(45) Date of Patent: Apr. 11, 2017

(54) DATA HEALTH MANAGEMENT

(71) Applicant: Bank of America Corporation, Charlotte, NC (US)

(72) Inventors: Jake Yara, Charlotte, NC (US); Srinivasulu Kummari, Hyderabad (IN); Jon A. Hamm, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 258 days.

(21) Appl. No.: 14/011,465

(22) Filed: Aug. 27, 2013

(65) Prior Publication Data
US 2015/0066866 A1 Mar. 5, 2015

(51) Int. Cl.
*G06F 7/00* (2006.01)
*G06F 17/30* (2006.01)

(52) U.S. Cl.
CPC .............. *G06F 17/30371* (2013.01)

(58) Field of Classification Search
CPC ......... G06F 17/30067; G06F 17/30286; G06F 17/30371; G06F 3/0626
USPC .................. 707/687, 792, 811, 662, 999.107
See application file for complete search history.

(56) References Cited

U.S. PATENT DOCUMENTS

| | | | |
|---|---|---|---|
| 7,039,701 B2 | 5/2006 | Wesley | |
| 7,251,689 B2 | 7/2007 | Wesley | |
| 7,680,830 B1 | 3/2010 | Ohr et al. | |
| 7,693,877 B1* | 4/2010 | Zasman | H04L 67/1097 707/662 |
| 7,761,428 B2 | 7/2010 | Herbst et al. | |
| 7,831,567 B2 | 11/2010 | Luther et al. | |
| 7,899,793 B2 | 3/2011 | Mimatsu | |
| 8,806,062 B1* | 8/2014 | Vertongen | H04L 29/08783 709/247 |
| 8,949,187 B1* | 2/2015 | Satish | G06F 11/1461 707/640 |
| 2003/0061265 A1* | 3/2003 | Maso et al. | 709/105 |
| 2005/0071383 A1 | 3/2005 | Herbst et al. | |
| 2005/0198078 A1 | 9/2005 | Steinmaier et al. | |
| 2005/0210041 A1* | 9/2005 | Taguchi | 707/100 |
| 2006/0101084 A1 | 5/2006 | Kishi et al. | |
| 2006/0106884 A1 | 5/2006 | Blumenau et al. | |

(Continued)

OTHER PUBLICATIONS

IBM InfoSphere Optim Solutions for Data Warehouses, Downloaded Aug. 27, 2013, (http://www-01.ibm.com/common/ssi/cgi-bin/ssialias?subtype=SP&infotype=PM&appname=SWGE_IM_IM_USEN&htmlfid=IMS14412USEN&attachment=IMS14412USEN.PDF), 6 pages.

*Primary Examiner* — Mohammed R Uddin
(74) *Attorney, Agent, or Firm* — Banner & Witcoff, Ltd.; Michael A. Springs

(57) ABSTRACT

A data health management apparatus may include a non-transitory memory and a processor communicatively coupled to the memory. In some cases, the processor may be configured to process instructions read from the memory. For example, the instructions may cause the processor to identify data associated with an application, where the data stored in at least one data repository. The processor may then analyze, the data stored in the at least one data repository, such as via a network, to determine a data health metric. The instructions may then cause the processor to determine an action to be performed on the data repository based on the determined data health metric.

19 Claims, 10 Drawing Sheets

(56) References Cited

U.S. PATENT DOCUMENTS

| | | |
|---|---|---|
| 2007/0136397 A1 | 6/2007 | Pragada et al. |
| 2007/0276843 A1 | 11/2007 | Lillibridge et al. |
| 2008/0168135 A1 | 7/2008 | Redlich et al. |
| 2008/0201552 A1 | 8/2008 | Tokie |
| 2008/0263108 A1 | 10/2008 | Herbst et al. |
| 2008/0263297 A1 | 10/2008 | Herbst et al. |
| 2008/0263565 A1* | 10/2008 | Luther et al. ............... 719/316 |
| 2010/0306175 A1 | 12/2010 | Johnson et al. |
| 2011/0191302 A1 | 8/2011 | Nasu et al. |
| 2012/0124046 A1* | 5/2012 | Provenzano ......... G06F 3/0605 707/737 |

* cited by examiner

DATA HEALTH MANAGEMENT

BACKGROUND

Often, different applications are used to generate, store and/or analyze business information. This business information may be stored in data repositories associated with the applications. The business information may have a life cycle that may or may not mirror the life cycle of the application. Early in the life cycle of the business information, such as during a development phase and/or testing phase of an associated application, data repositories storing the business information may go through a highly active phase. For example, the structure, format, storage location of the data repositories may go through multiple iterations. During an active portion of the business information lifecycle, such as during an active use phase of the associated application, the requirements for storing the data repositories may increase along with the amount of the business information processed and/or produced by the applications. Towards the end of the life cycle of the business information, such as after the application is phased out, the business information stored in the data repositories may be retained for a duration corresponding to a data retention policy or for legal requirements. When the business information is no longer needed or is no longer useful in the course of business and/or for legal requirements, the business information may be destroyed.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In an illustrative example, a data health management apparatus may include a non-transitory memory and a processor communicatively coupled to the memory. In some cases, the processor may be configured to process instructions read from the memory. For example, the instructions may cause the processor to identify data associated with an application, where the data stored in at least one data repository. The processor may then analyze, the data stored in the at least one data repository, such as via a network, to determine a data health metric. The instructions may then cause the processor to determine an action to be performed on the data repository based on the determined data health metric.

In some cases, an illustrative system for managing a data repository may include a user interface that may be communicatively coupled to a data health computer. The user interface may include at least a first screen for receiving information about an application having a data repository. The illustrative data health computer may include a non-transitory memory and a processor communicatively coupled to the memory. The processor may be configured to process instructions that cause the data health computer to identify the data repository associated with the application, determine at least one data health metric associated with the data repository; and initiate a data management activity on the data repository based on the at least one data health metric.

An illustrative method for managing a data repository may include analyzing, by a computer, a data repository associated with an application to determine a data health metric. The data health metric may correspond to a characteristic of the data repository. The method may continue by determining a data health management plan based on the data health metric, where the data health management plan is for managing growth and/or accessibility of the data. The method may further include initiating a data management activity on at least a portion of the data repository according to the data health management plan and/or the data health metric.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made.

Figure 1:
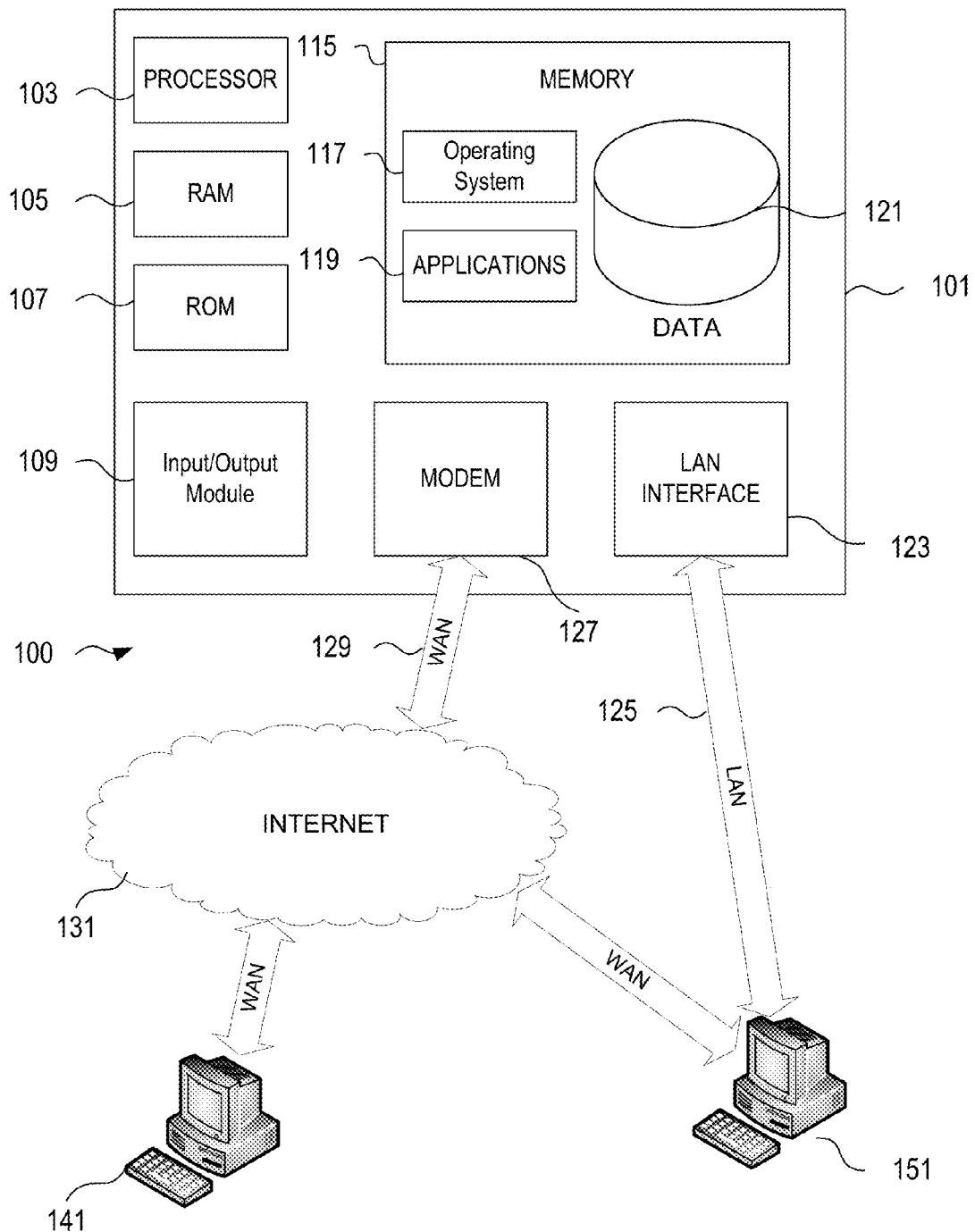
FIG. 1 illustrates a schematic diagram of a general-purpose digital computing environment in which certain aspects of the present disclosure may be implemented.

FIG. 1 illustrates a block diagram of a generic computing device 101 (e.g., a computer server) that may be used according to an illustrative embodiment of the disclosure. The computer server 101 may have a processor 103 for controlling overall operation of the server and its associated components, including RAM 105, ROM 107, input/output (I/O) module 109, and a memory 115.

The I/O module 109 may include a microphone, keypad, touch screen, and/or stylus through which a user of the computing device 101 may provide input, and may also include one or more of a speaker for providing audio output and a video display device (e.g., a user interface) for providing textual, audiovisual and/or graphical output. Software may be stored within the memory 115 and/or other storage to provide instructions to the processor 103 for enabling the server 101 to perform various functions. For example, the memory 115 may store software used by the server 101, such as an operating system 117, one or more application programs 119, and an associated database 121. Alternatively, some or all of the computer executable instructions utilized by the computing device 101 may be embodied in hardware or firmware (not shown). As described in detail below, the database 121 may provide centralized storage of account information and account holder information for the entire business, allowing interoperability between different elements of the business residing at different physical locations.

The server 101 may operate in a networked environment supporting connections to one or more remote computers, such as the terminals 141 and 151. The terminals 141 and 151 may be personal computers or servers that include many or all of the elements described above relative to the server 101. The network connections depicted in FIG. 1 may include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing wired and/or wireless communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the disclosure may include computer executable instructions for invoking user functionality related to communication, such as email, short message service (SMS), and voice input and speech recognition applications.

The computing device 101 and/or the terminals 141 or 151 may also be mobile terminals (e.g., a cell phone, a tablet computer, a laptop computer, a smart phone, and the like) that may include various other components, such as a battery, speaker, and/or antennas (not shown).

The disclosure is operational with numerous other general purpose or special purpose computing system environments or configurations. Examples of computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules may include routines, programs, objects, components, data structures, and the like for performing particular tasks or implementing particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
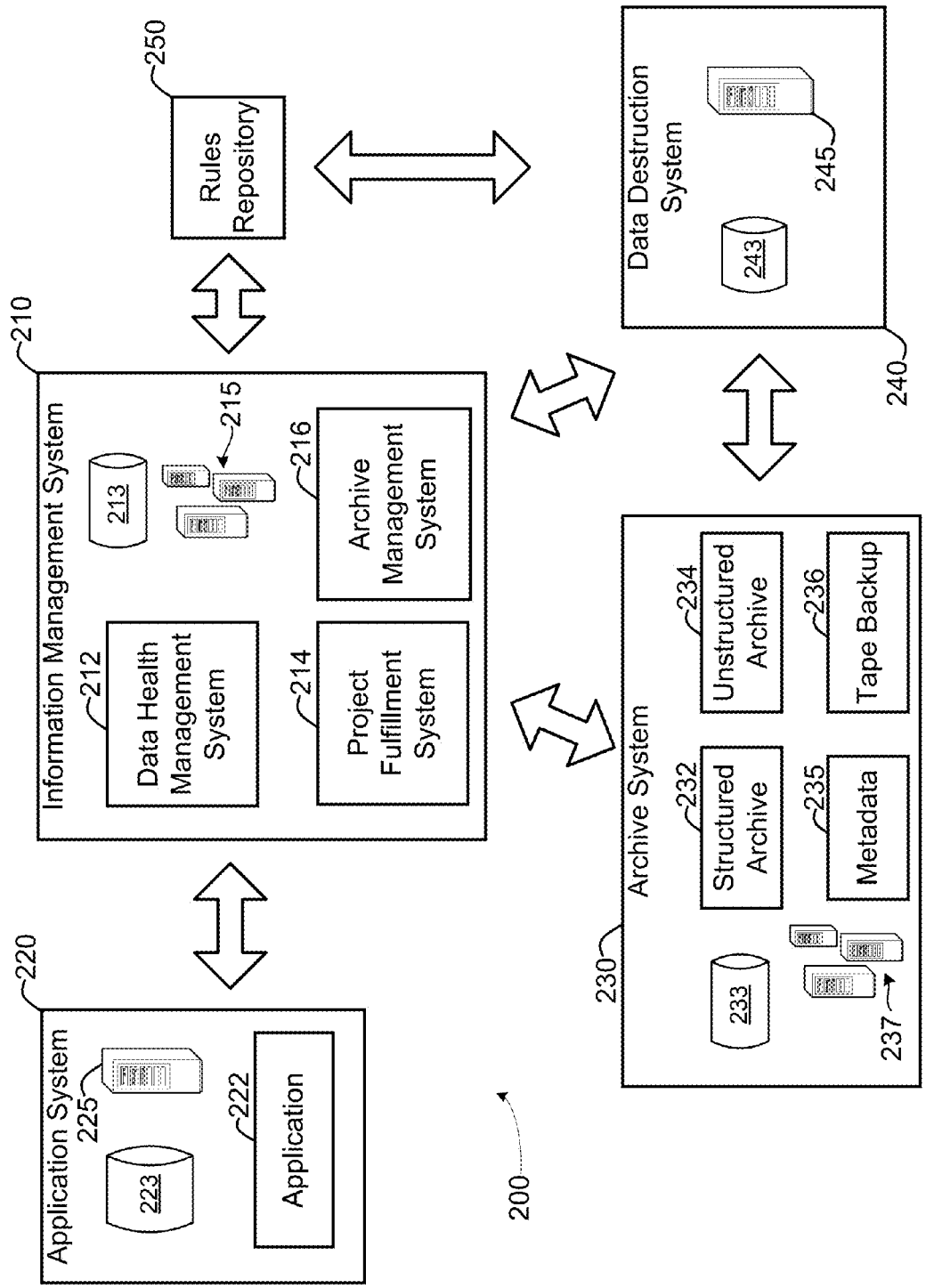
FIG. 2 is an illustrative block diagram of a system for managing data associated with one or more applications according to one or more aspects of the present disclosure.

FIG. 2 is an illustrative block diagram of a system 200 for managing data associated with one or more applications 222 according to one or more aspects of the present disclosure. The system 200 may include an information management system 210 that may be communicatively coupled to an application system 220, an archive system 230, a data destruction system 240 and a rules repository 250. In some cases, the information management system 210 may be implemented by a business organization (e.g., a financial institution, a corporation, a governmental organization, an educational institution) to manage information used by and/or produced by one or more applications 222 that may be processed by one or more computing devices, such as the server 225.

In some cases, organizations (e.g., a business organization, a financial organization, an educational organization, a governmental organization, and the like) may design and/or use one or more applications, such as the application 222, to perform a desired business function. For example, a business organization may desire to perform business functions including a financial activity (e.g., a financial transaction, a balance transfer, and the like), a healthcare activity (e.g., medical record processing, a patient registration, and the like), an investment activity (e.g., a trading transaction, an options purchase, and the like), and/or an employment activity (e.g., a personnel records management, and the like). The application 222 may be used, at least in part, to process and/or store confidential and/or private information corresponding to a business activity (e.g., financial account information, trade secrets, investment activity information, and the like) and/or personal information (e.g., financial account information, credit card information, social security numbers, health records, and the like).

Implementing data privacy and/or data retention policies are some functions of the data management system 210. In an example, a business entity may have a data retention policy for removing (e.g., scrubbing) personal, private and/or confidential information from the data repository 223. For example, the data retention policy may be used for anonymizing data, such as by removing identifying information about a user (e.g., a social security number, an account number, a credit card number, an address, a phone number, and the like) from the data repository. In another example, the organization may desire and/or be required to retain business information for a period of time. In some cases, the period of time may be a defined time period that may be specified in a data retention policy and/or may be based on a particular legal requirement. For example, a business organization may implement a data retention policy to destroy communications (e.g., emails, phone messages, and the like), or other information, after a specified period of time (e.g., 6 months, 1 year, 5 years, and the like). In another example, a government entity may enact a law implementing a mandatory data retention scheme that may require a business organization to retain for a specific period of time before destroying or anonymizing the data. Often different jurisdictions, such as different countries (e.g., the United States, the United Kingdom, Germany, Japan, India, and the like) and/or different states or provinces (e.g., Illinois, North Carolina, New York, Ontario, and the like) may have different laws governing the retention of certain information. As such, managing the content stored in the data repository 223 and/or managing a time period to retain the information stored in the data repository may be complex. For example, an international business organization may use an application 222 to facilitate financial transfers between accounts in two countries. The application 222 may store information associated with the financial transaction in the data repository 223. In some cases, the business organization may have a data retention policy defining a first time period for storing information in a data repository, the first jurisdiction (e.g., the United States), may have a regulation defining a second time period for storing information regarding the financial transaction (e.g., storing a currency transaction report for five years), and the second jurisdiction (e.g., India) may have a different regulation defining a third time period for storing information regarding the financial transaction (e.g., storing information regarding a financial transaction for 10 years). As such, business organizations may include the rules repository 250 in the system 200 for storing and/or managing the rules and/or regulations governing how long data stored within the data repository 223 should be retained. In some cases, information associated with an individual data record (e.g., a financial transaction record, a social security number, and the like) may cause the complete data repository 223 to continue to be stored past a normal retention time period. Similarly, each data record stored in the data repository 223 may be associated with a unique record code, where the record codes may be used when managing the data repositories.

When using the applications, the business organizations typically progress through common stages of an application life cycle, including any number of a design phase, a development phase, a testing phase, an active phase, an end of service phase, and a decommissioning phase. The information stored, such as data stored within a data repository 223 associated with the application 222 may have a similar life cycle. For example, during the design and/or development phase, the business organization may specify and/or design the format, structure and/or contents of the data repository 223. During the testing phase of the application lifecycle, the structure and/or desired contents of the data repository 223 may be finalized and the application 222 may begin to process information stored in the data repository 223 and/or store information to the data repository 223. During the active phase of the application lifecycle, the data repository 223 may also enter an active phase, where the data repository 223 may experience a period of growth. During this growth phase of the data repository 223, the size of the data repository 223 may reach a point where at least a portion of the data repository is compressed, or otherwise reduced in size. Often, such as when the application enters the end of service and/or the decommissioning phase, the data repository 223 enters an inactive phase. In some cases, the data repository 223 or a portion of the data repository may be deemed inactive, such as by a data retention policy, while the application is still in the active phase. The inactive data may then be archived or otherwise stored according to the rules and/or regulations stored in the rules repository 250. For example, one or more components of the information management system 210 may be used to archive or otherwise backup (e.g., a tape backup) the data repository 223 and/or a portion of the data repository.

At some point during the retention period, the information stored in the data repository 223 may be destroyed based on one or more legal requirements and/or business policies. However, sometimes information stored in the data repository 223 may become relevant to and/or evidence in a legal matter or proceeding. As such, the data repository 223 may be retained until the legal matter and/or proceeding is resolved (e.g., a "legal hold"). This may cause the data repository 223 to be stored for a longer time period than is set forth in the rules and/or regulations stored in the rules repository 250. In some cases, legal requirements or business policies may cause business information in a particular data repository 223 (e.g., at a particular physical location) to be destroyed, while retaining similar business information in one or more other similar data repositories. As can be seen, managing the content stored in the data repository 223 and/or managing a time period to retain the information stored in the data repository may be difficult.

In some cases, the data repository 223 may be part of a data warehouse that may access numerous data sources through different tools for one or more end users, where the end user is associated with a particular role within the business organization. In some cases, the data repository 223 may be designed for use with a particular tool and/or a particular version of the tool. Also, the data repository 223 may be stored on one or more different hardware devices, such as a server, a redundant array of independent disks (RAID), or device useful in storing and/or accessing large amounts of data. Over time, the hardware devices and/or tools used for managing the data repository may become obsolete or may require maintenance. When recognized, the defective and/or obsolete devices or tools may be replaced with newer versions of the same hardware device and/or tool. For example, a server may be replaced with a new server, an operating system may be upgraded to a newer version, a tool may be upgraded to a new version, additional storage may be added to an existing hardware device, and the like. In some cases, such as when a hardware device and/or tool have been deemed obsolete, a different hardware device and/or a different tool may be substituted. For example, a tool provided by a first vendor may be discontinued and a different tool from a second vendor (or the first vendor) may be used to replace the discontinued tool. During these times, one or more components of the information management system 210 may be used to facilitate the upgrade and/or replacement of hardware devices and/or tools associated with the data repository 223. In some cases, one or more components of the information management system 210 may be used for migrating the data repository from a first hardware device to a second hardware device and/or for migrating the data repository from a first tool to a second tool. Often, the data health management system 212 may be used to determine that an upgrade and/or a migration may be necessary using a determined data health metric. The data management system 212 may then initiate the upgrade and/or migration process by the project fulfillment system 214.

The information management system 210 may include the data health management system 212, the project fulfillment system 214 and/or an archive management system 216 for managing information associated with one or more applications, such as the application 222. Each of the data health management system 212, the project fulfillment system 214 and/or an archive management system 216 may include one or more servers 215 and at least one data storage unit 213. The data storage unit may be used for storing instructions for performing data health management activities, project fulfillment activities and/or archive management activities by the one or more servers 214. In some cases, each of the data health management system 212, the project fulfillment system 214 and/or an archive management system 216 may be implemented to run on dedicated computing devices (e.g., the one or more servers 215). In other cases, two or more of the data health management system 212, the project fulfillment system 214 and/or an archive management system 216 may be implemented to operate on a common computing device.

In an example, the data health management system 212 may include a data health computer (e.g., the computing device 101) that may be communicatively coupled via a communication link (e.g., a communication network, the Internet, and the like) to a user interface (e.g., the input/output module 109). The user interface may include one or more screens that may be used to facilitate entry of information about an application and/or a data repository to be examined. The data health computer may be configured to identify the data repository associated with the application, determine at least one data health metric associated with the data repository, and/or initiate a data management activity on the data repository based on the at least one data health metric. In some cases, the data health metric may include a data repository size and the data management activity includes compressing the data repository when the data repository size is greater than or equal to a specified data compression threshold value. In some cases, the data health metric may include determining an application status and wherein the data management activity includes creating an archive of at least a portion of the data repository based on the application status. In some cases, the data health computer may be configured to determine at least one data health metric associated with a type of data stored in one or more data records within the data repository 223.

In some cases, the data health metric may be associated with an amount of time necessary to connect to the data repository 223 (e.g., a connection time) and/or a number of users accessing the data repository 223 (e.g., a current number of users, an average number of users, and the like). In some cases, the data health metric may include one or more details about the data repository 223 (e.g., a creation time, a creation date, an open mode, a log mode, and the like), a status of the data repository 223 (e.g., a size, an average number of executions, a number of reads, a number of writes, a block size, a number of partitions, and the like). In some cases, the data health metric may be associated with a size of the data repository (e.g., status, a number of free bytes, a number of free blocks, a read time, a write time, a cache size, a buffer size, a maximum size, a shared area size, a number of used blocks, a number of used bytes, and the like). In some cases, the data health metric may correspond to a performance of the data repository 223 (e.g., a status, a wait time, a read time, a write time, a hit ratio, a logged-in time, a CPU usage time, a number of memory sorts, a number of table scans, a number of physical reads, a number of logical reads, a commit rate, and the like). In some cases, the data health metric may correspond to a database segment characteristic (e.g., an extent, a number of extents, a maximum number of extents, a number of shrinks, a number of wraps, a number of extends, and the like). In some cases, the data health metric may correspond to a session characteristic (e.g., an event characteristic, a session state, a wait time, a wait time ratio, and the like). In some cases, the data health metric corresponds to a disk read characteristic (e.g., a number of disk reads, a number of executions, a number of disk reads per execution, a number of queries, and the like). In some cases, the data health metric may correspond to a throughput characteristic, an error count, an error type, a semaphore usage characteristic, a transaction rate, an event count, and/or a CPU metric (e.g., an idle time, a wait time, a system use time, a user access percentage, task switching characteristics, and the like). The listed data health metrics are representative of typical data health metrics and not meant to be limiting in any way.

In some cases, one or more data health metrics may be associated with a type of data stored in the data repository. For example, an access time, a block size, a number of partitions used by the data repository and/or other data health metrics may be dependent upon a data type being accessed within the data repository 223. For example, the data health management system may analyze one or more data records within the data repository 223 to determine whether structured data (e.g., a database, a flat file, and the like), unstructured data (e.g., a document, an email, an application, and the like), or both structured data and/or unstructured data is stored in the data repository 223. If structured data is found within the data repository 223, the data health management system 212 may initiate a creation of a structured archive 232 of at least a portion of the information stored in the data repository 223 by the archive management system 216. Similarly, if unstructured data is found within the data repository 223, the data health management system 212 may initiate a creation of an unstructured archive 234 of at least a portion of the information stored in the data repository 223 by the archive management system 216. In some cases, such as when both structured data and unstructured data are found in the data repository 223, the data health management system 212 may initiate a creation of a structured archive 232 of a first portion of the data repository 223 and an unstructured archive 234 of at least a different second portion of the information stored in the data repository 223 by the archive management system 216. In some cases, the data health management system 212 may initiate a destruction of one or more archives (e.g., the structured archive 232, the unstructured archive 234, and the like) by a data destruction system 240, based on one or more of the data retention rules and/or regulations stored in the rules repository 250, metadata 235 associated with each of the structured archive 232 and the unstructured archive 234, and/or one or more data health metrics.

In an example, the information management system 210 may include a project fulfillment system 214 and/or an archive management system 216. In some cases, one or more functions of the archive management system 216 may be implemented within the project fulfillment system 214, or one or more components of the project fulfillment system 214 may be implemented within the archive management system 216. The project fulfillment system 214 may be configured to perform one or more data management functions, such as compressing the data repository, removing (e.g., scrubbing) private and/or other non-public information from the data repository, creating the structured archive 232, creating the unstructured archive, and/or creating and/or managing a backup (e.g., the tape backup 236) of the data repository 223. In some cases, the project fulfillment system may analyze information stored in the data repository 223, the structured archive 232, the unstructured archive 234, and/or the tape backup 236 to determine identification information (e.g., metadata) used when managing information within the system 200. For example, the project fulfillment system 214 may be configured to analyze information stored in the data repository to determine metadata 235 that may be associated with the data repository, the structured archive 232, the unstructured archive 234, and/or the tape backup 236. Examples of illustrative metadata are shown below in Table 1.

TABLE 1

Metadata Examples for information stored in an archive, a tape backup and/or a data repository.

| Metadata name | Description | Example |
| --- | --- | --- |
| Record Identifier | An identifier used in order to provide a reference which is unique in any context of the record | US-XXXX-XXXXX |
| Application ID | the unique application ID that created the record. | XXXXX |
| Intake date and time | date/time in which the record was submitted to the data repository. Normalized to GMT (UTC) based on ISO 8601 standards for definition | 2002-10-10T12:00:00 |
| Record type | Line of business specific document name types | Tax form, W2, 1099 |
| Record Media type | Internet standard to describe the content encoding and is reflected in file name extension | .doc, .pdf |
| Record Language | describes the language/character set; ISO 639-2 defines the 3-letter codes for each language | eng (for English) |
| Record Country of Origin | Country Location of origination. ISO 3166 Country code definition. uses a 2-character letter code for each defined country | US |
| Business Function | Line of business identifier releasing the record. Line of business has the primary responsibility of the record. | Trust, Consumer lending |
| Business Sub-Function | Line of business dept. identifier. An identifier used to identify a specific department within a specific Business Function | Residential Closing |
| Record Code | Record Code - Is the unique, alphanumeric code associated with each type of record. The record code will determine the legally required retention timeframe before disposition. | XXXXXX |
| Classification | Flag indicating if the record contains Public, Proprietary or Confidential information. 0 = Public, 1 = Proprietary, 2 = Confidential, 3 = Confidential NPI | 0, 1, 2, 3 |
| Record Trigger Date | The date in which timed retention rules was started (UTC/GMT). This could be an automatic field based on user/application time/event conditions/rules. Represents RM condition of active records moving to inactive. | 2001-11-01T12:00:00 |
| Submitting ID | the unique associate ID that created the record. Applies to person who ingested (e.g., scanned in) the document, not the necessarily the person who created content | 19amz70 |
| Record Creator name | creator (or author) - An entity or person responsible for creating the specific content | Last name, First Name |
| Record Creation date and time | date/time stamp when the document was created. Usually pertains to electronic documents and is part of the document properties | 2003-10-21T12:42:32 |
| Is Redacted | Flag that indicates if personal/private information has been redacted. Mandatory if applicable. | Yes/No |
| Redaction create date | Date when redacted record was created. Mandatory if applicable. | 2006-04-19T09:32:23 |
| Redaction original Record ID | unique GUID linking redacted record to original record. Mandatory if applicable. | XXXXX, N/A |
| Is E-Sign | Flag indicating if the record contains a digital signature. Mandatory if applicable; additional requirements will apply. | Yes/No |
| Is Encrypted | Flag indicating if the record is encrypted. Mandatory if applicable; additional requirements will apply. | Yes/No |
| Is DRM | Flag indicating if the record contains digital rights management. Mandatory if applicable; additional requirements will apply. | Yes/No |
| check sum | For Users/Applications requiring a maintained checksum of the stored record. Checksum is fixed-size data computed from an arbitrary block of digital data for the purpose of detecting accidental errors that may have been introduced during its transmission or storage. The integrity of the data can be checked at any later time by recomputing the checksum and comparing it with the stored one. If the checksums match, the data was almost certainly not altered. | 0x1B642 |
| Foreign Repository Doc ID | Doc ID in foreign repository- For records that need to be stored in a non-managed electronic repository | DEXXXXXXX |
| Foreign Repository ID | Foreign repository Identifier | XXXXX |
| Tax ID Number | Tax ID number representing the customer | XX-XXXXXXX |
| Client ID | Unique Customer/Client ID that the record pertains to | XXXXXXXX |
| Document subject | Subject of contents | Financial Transaction |
| Document description | Description of contents. Required if record type does not adequately describe the record for retrieval purposes. | transaction-trust to trust |

TABLE 1-continued

Metadata Examples for information stored in an archive, a tape backup and/or a data repository.

| Metadata name | Description | Example |
| --- | --- | --- |
| Document keywords | keywords/tags of contents | transfer, trust, Germany |
| Document title | Required if record type does not adequately describe the record for retrieval purposes. | Approval - transfer |
| Document page count | document page count | 3 |
| Is attachment embedded | Compound documents | Yes/No |
| Is Searchable | Text Searchable contents via search engines | Yes/No |

In some cases, the project fulfillment system 320 may be used to implement a data health management plan as determined by the data health management system 212 and/or may implement a predetermined data health management plan that may be stored in a memory device. In some cases, the project fulfillment system 320 may monitor the progress of the data health management plan and/or maintain a record of a state of the data health management plan. For example, a data health management plan may cause the project fulfillment system to periodically monitor growth and/or a growth rate of the data repository 223 to determine whether the size may need to be compressed. A data health management plan may include monitoring the age and/or condition of hardware and/or software used to implement the application system 220, including the data repository 223 and, if determined necessary, performing steps necessary to migrate one or more components of the application system 220 to a newer platform (e.g., a new hardware device, a new software component, an updated software component, and the like), and/or adding additional hardware and/or software components (e.g., additional memory, another hard disk drive, and the like). In some cases, a data health management plan may include implementing one or more data retention policies, such as policies stored in the rules repository 250. For example, a data health management plan may cause the project fulfillment system 214 to periodically analyze information in the data repository 223 using one or more data retention policies. If determined that information stored in the data repository 223 violates and/or otherwise meets conditions set forth in the data retention policy, the project fulfillment system 214 may initiate a redaction procedure and/or other data "scrubbing" procedure to remove private and/or confidential information as may be defined in the data retention policy.

In some cases, a data health management plan may include creating and/or managing an archive of information associated with the application system 220. For example, the data health management system 212 may determine that at least a portion of the data repository 223 should be archived, due to the data repository 223 reaching a predetermined size threshold, the application 222 being phased out, information stored in the data repository meeting a predetermined age threshold, and/or the like. If so, the project fulfillment system 214 may initiate a procedure for creating, and subsequently managing, one or more archives of the information stored in the data repository 223. For example, the project fulfillment system may be used to create an unstructured archive 234, a structured archive 232, or both, when appropriate to archive the information in the data repository 223. Separately, or as part of the data health management procedure, the project fulfillment system may be used to create a tape backup of at least a portion of the information stored in the data repository 223. The project fulfillment system 214 may then determine and/or associate metadata with each archive (e.g., the structured archive 232, the unstructured archive 234, or both.) and/or each tape backup. In some cases, the metadata for each of the one or more archives and/or tape backups may be stored in a central location, such as a metadata repository and/or locally to each of the archives and/or tape backups. The project fulfillment system 214 may then communicate information about any created archives and/or tape backups to the archive management system 216, including a location of the individual archives and/or tape backups, metadata associated with each archive and/or tape backup, chain of custody information, and the like.

In some cases, the archive management system 216 may include an archive management computer and one or more archives (e.g., the structured archive 232, the unstructured archive 234) and/or tape backups 236 that may be stored on one or more computing devices. The archive management computer may include a non-transitory memory and a processor that may cause the archive management computer to determine and/or analyze metadata associated with the content of the one or more archives and/or tape backups. The archive management computer may analyze metadata according to one or more data retention policies stored in the rules repository 230 in response to a request from the data health management system 212 and/or the project fulfillment system 214. In some cases, the archive management computer may determine whether or not a particular archive and/or tape backup is a candidate for destruction. If so, the archive management computer may communicate with a data destruction system 240 to perform the destruction of the particular archive and/or tape backup. In some cases, the data destruction system 240 may include a computing device 245 configured to analyze the information stored within the archive and/or the tape backup to determine whether the candidate archive and/or tape backup can be destroyed. For example, one or more data records may be subject to a data retention policy and/or regulation (e.g., a legal hold), so that the archive cannot be destroyed. If so, the data destruction system may provide feedback to the archive management system and/or the project fulfillment system about the success and/or failure of the destruction process.

Figure 3:
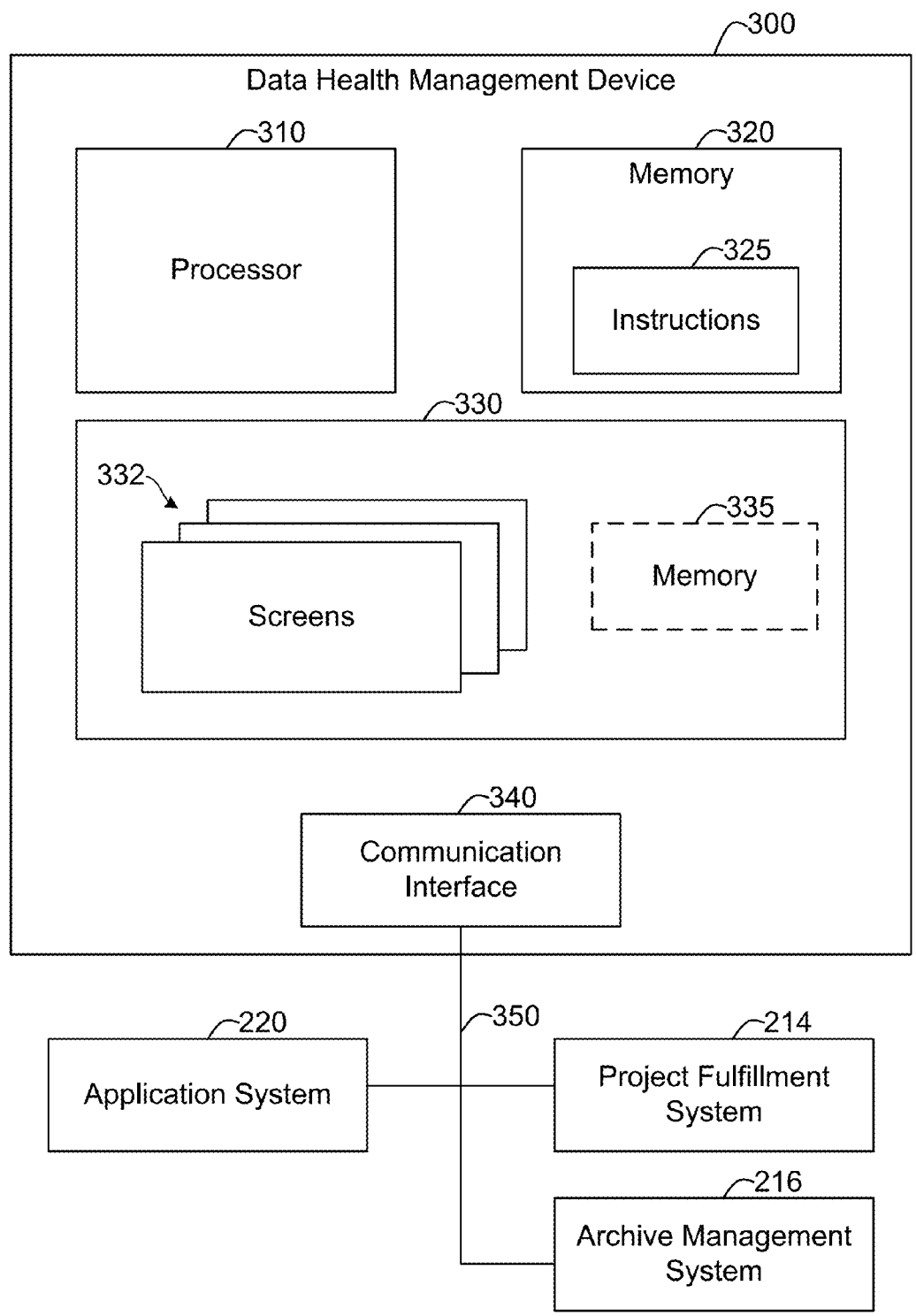
FIG. 3 is an illustrative block diagram of the data health apparatus for determining at least one data health metric for data associated with the one or more applications according to one or more aspects of the present disclosure.

FIG. 3 is an illustrative block diagram of an illustrative data health management device 300 for determining at least one data health metric for data associated with the one or more applications according to one or more aspects of the present disclosure. In some cases, the data health management device 300 may be implemented using at least a portion of the computing device 101. In the illustrative embodiment of FIG. 3, the data health management device 300 may include a processor (e.g. microprocessor, microcontroller, etc.) 310, a memory 320, a user interface 330, and a communication interface 340. The communication interface 340 may include one or more communication interfaces for allowing the data health management device 300 to communicate with one or more other devices, such as the project fulfillment device 410, the Archive management device 450 of FIG. 4, the application system 220 and/or the rules repository 250. For example, the communication interface 340 may include a communication interface that allows the data health management device 300 to communicate with one or more components of the application system 220, the project fulfillment system 214 and/or the archive management system 216 via the network 350. In some cases, the communication interface 340 may include one or more wired and/or wireless communication interfaces, such as an Ethernet port, a wireless port, an RS-232 port, an RS-422 port, an RS-485 port, and the like. In such cases, the communication interface 240 may allow data entry, reprogramming, debugging, and/or other operations to be done remotely, such as by an authorized user.

In some cases, the communication interface 340 may include a data port that may facilitate communication via a wired or wireless protocol. For example, the data port may include a serial port, a parallel port, a CAT5 port, a universal serial bus (USB) port and/or the like. In some cases, the data port may be used to download and/or upload information from a USB flash drive or some other data source. Other remote devices may also be employed, as desired. The data port may be configured to communicate with the processor 310 and may, if desired, be used to upload information to the processor 310 and/or download information from the processor 310. Information that can be uploaded and/or downloaded may include, for example, values of operating parameters. In some cases, the data port may be used to download data stored within the memory 320 for analysis. For example, the data port may be used to download a faults and/or alerts log or parts thereof to a remote device such as a USB memory stick (also sometimes referred to as a thumb drive or jump drive), a personal computer, a laptop, a tablet computer, a PDA, a smart phone, or other device, as desired.

The processor 310 may operate using an algorithm for determining a data health metric and/or for initiating a data health management activity on a data repository such as, for example, the data repository 223 shown in FIG. 2. The processor 310 may, for example, operate in accordance with an algorithm for analyzing the data repository 223 associated with the application 222 to determine at least one data health metric corresponding to a characteristic of the data repository 223. The algorithm may then determine a data health management plan based on the determined data health metric, where the data health management plan may be used for managing growth and/or accessibility of the information stored in the data repository 223. Once the data health management plan has been determined, the algorithm may cause the data health management device 300 to initiate a data management activity on at least a portion of the data repository 223 according to the data health management plan and the data health metric. In some cases, the data health management computer may initiate a data management activity on the data repository 223 without determining a complete data health management plan. In one example, the processor 310 may be configured to operate the algorithm using a personal computing operating system, a server operating system, an open source operating system and/or an embedded operating system. In some cases, the data health management device 300 may include a timer (not shown).

The timer may be integral to the processor 310 or may be provided as a separate component.

The memory 320 of the illustrative data health management device 300 may communicate with the processor 310. The memory 320 may be used to store any desired information, such as instructions 325 for implementing the aforementioned control algorithm, one or more determined data health metrics, a customizable data health management plan, a predetermined data health management plan, schedule times, diagnostic limits, and/or the like. The memory 320 may be any suitable type of storage device including, but not limited to, RAM, ROM, EPROM, flash memory, a hard drive, and/or the like. In some cases, processor 310 may store information within the memory 320, and may subsequently retrieve the stored information.

In the illustrative embodiment of FIG. 3, the user interface 330 may be any suitable user interface that may allow the data health management device 300 to display and/or solicit information, as well as accept one or more user interactions with the data health management device 300. In some cases, the user interface 330 may be implemented at a location remote from the data health management device 300 and may communicate to the data health management device 300 via the communication interface 340 and/or the communication link 350 (e.g., a wired Ethernet network, a wireless Ethernet network, the Internet, and the like). In some cases, a common user interface 330 may be used to communicate with one or more components of the application system 220, the project fulfillment system 214, the archive management system 216, and/or the like. The user interface 330 (when provided) may permit a user to enter data such as desired data health metrics, starting times for initiating analyzing the data repository 223 for the desired data health metrics, ending times, diagnostic limits, conditions under which diagnostic limits may be suspended, responses to alerts, and the like. The user interface 330 may include one or more user interface screens 332 to facilitate interaction with a user. For example, one or more user interface screens 332 may be used to identify a data repository 223, a tape backup 236, an archive (e.g., the structured archive 232, the unstructured archive 234, etc.), or the like. In some cases, the user interface screens 332 may be used to enter and/or identify metadata 235 associated with information stored in the data repository 223, the tape backup 236, an archive (e.g., the structured archive 232, the unstructured archive 234, etc.), or the like that may be associated with the data One or more of the user interface screens 332 may be used to display a determined data health metric, the determined data health management plan, and/or whether a data health management activity has been recommended and/or initiated. The user interface 330 may further include a memory device 335 that may be used for storing instructions and/or data for managing the display and/or use of the user interface screens 332. In some cases, user interface 330 may include a display and a distinct keypad. A display may be any suitable display. In some instances, the display may include or may be a liquid crystal display (LCD), and in some cases a fixed segment display or a dot matrix LCD display. If desired, user interface 330 may be a touch screen LCD panel that functions as both display and keypad. In some instances, a touch screen LCD panel may be adapted to solicit values for a number of operating parameters and/or to receive such values, but this is not required.

Figure 4:
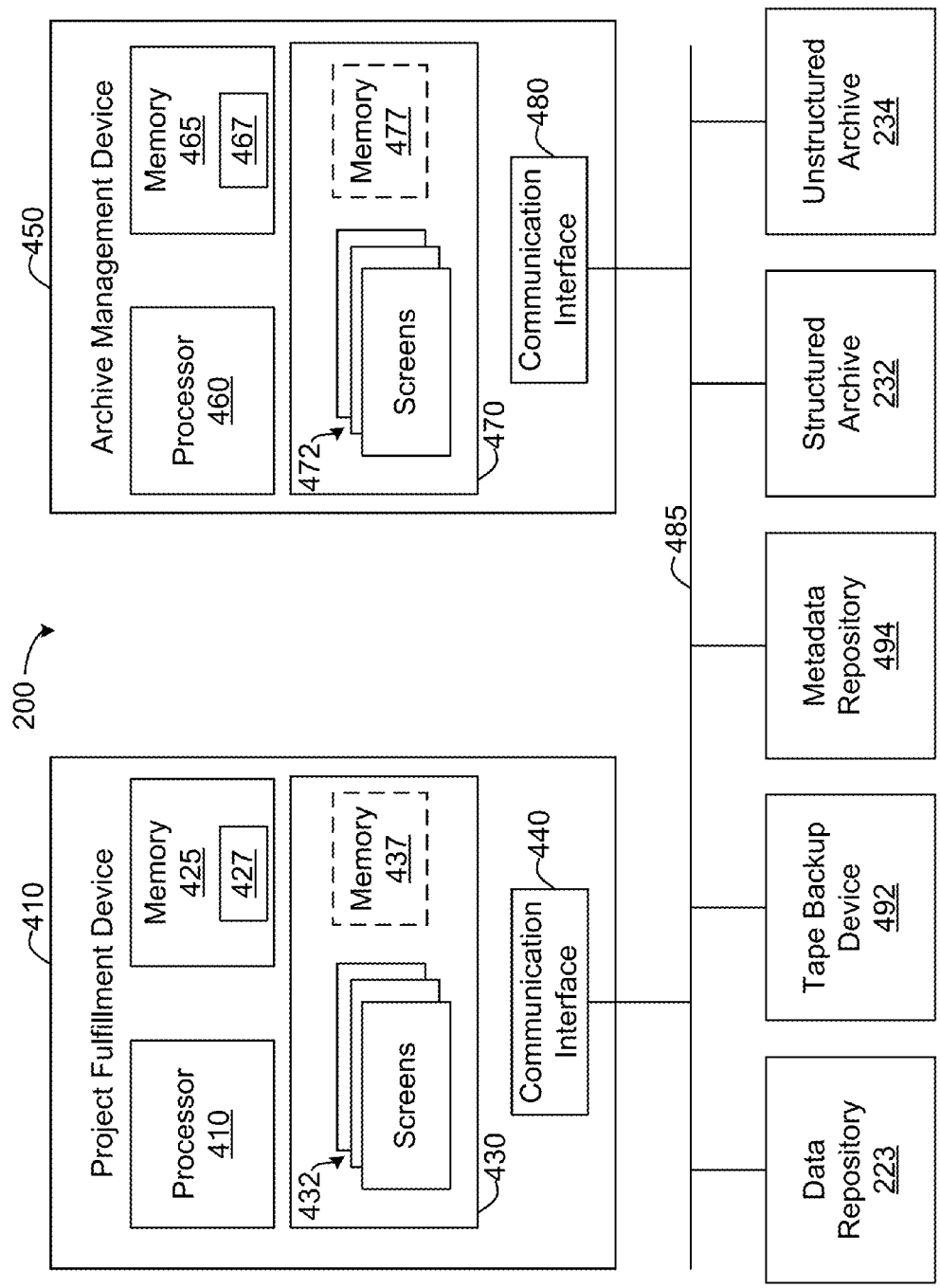
FIG. 4 is an illustrative block diagram of a portion of the information management system of FIG. 2 for managing data associated with the one or more applications according to one or more aspects of the present disclosure.

FIG. 4 is an illustrative block diagram of the information management system 210 of FIG. 2. In some cases, the project fulfillment device 410 and/or the archive management device 450 may be implemented on a same computing device 101, or portions of different computing devices. In the illustrative embodiment of FIG. 3, the project fulfillment device 410 may include a processor (e.g. microprocessor, microcontroller, etc.) 410, a memory 425, a user interface 430, and a communication interface 440. Similarly, the archive management device 450 may include a processor (e.g. microprocessor, microcontroller, etc.) 460, a memory 465, a user interface 470, and a communication interface 480. In some cases, the project fulfillment device 410 and/or the archive management device 450 may include a timer (not shown). The timer may be integral to the processor 410, 460 or may be provided as a separate component.

The communication interface 440 may include one or more communication interfaces for allowing the project fulfillment device 410 to communicate with one or more other devices, such as the data health management device 300, the archive management device 450, the application system 220 and/or the rules repository 250. For example, the communication interface 440 may include a communication interface that allows the project fulfillment device 410 to communicate with one or more devices of the system 200 via a communication link (e.g., the network 485, the network 350, and the like). Similarly, the archive management device 450 may include a processor (e.g. microprocessor, microcontroller, etc.) 460, a memory 465, a user interface 470, and a communication interface 480.

Similarly, the communication interface 480 may include one or more communication interfaces for allowing the archive management device 450 to communicate with one or more other devices, such as the data health management device 300, the project fulfillment device 410, the application system 220 and/or the rules repository 250. For example, the communication interface 480 may include a communication interface that allows the archive management device 450 to communicate with one or more devices of the system 200 via a communication link (e.g., the network 485, the network 350, and the like). In some cases, the communication interface 440, 480 may include one or more wired and/or wireless communication interfaces, such as an Ethernet port, a wireless port, an RS-232 port, an RS-422 port, an RS-485 port, and the like. In such cases, the communication interface 440, 480 may allow data entry, reprogramming, debugging, and/or other operations to be done remotely, such as by an authorized user.

In some cases, the communication interface 440, 480 may include a data port that may facilitate communication via a wired or wireless protocol. For example, the data port may include a serial port, a parallel port, a CAT5 port, a universal serial bus (USB) port and/or the like. In some cases, the data port may be used to download and/or upload information from a USB flash drive or some other data source. Other remote devices may also be employed, as desired. The data port may be configured to communicate with the processor 420, 460 and may, if desired, be used to upload information to the processor 420, 460 and/or download information from the processor 420, 460. Information that can be uploaded and/or downloaded may include, for example, values of operating parameters. In some cases, the data port may be used to download data stored within the memory 425, 465 for analysis. For example, the data port may be used to download a faults and/or alerts log or parts thereof to a remote device such as a USB memory stick (also sometimes referred to as a thumb drive or jump drive), a personal computer, a laptop, a tablet computer, a PDA, a smart phone, or other device, as desired.

Turning to the project fulfillment device 410, the processor 410 may operate using an algorithm for implementing a data health management plan, such as in response to an initiation from the data health management device 300, and/or based on a predetermined data health management plan. For example, the processor may cause the project fulfillment device 410 to analyze at least a portion of the data repository 223 using one or more data retention policies and/or regulations stored in the rules repository 250 to determine whether or not private and/or confidential information is to be removed and/or redacted from the data repository 223. If so, the processor 410 may then redact and/or remove the private and/or confidential information from the data repository 223. In some cases, the processor 410 may create metadata indicating a redaction and/or removal of information took place. The metadata may be stored in a metadata repository 494 and be associated with the data repository 223 and/or archives and/or tape backups associated with the data repository 223. In some cases, the processor may cause the project fulfillment device 410 to implement a data health management plan for managing a size of the data repository 223 and/or an amount of information stored in the data repository 223. For example, the processor 410 may be configured for initiating a compression of at least a portion of the data repository 223, based on the size of the data repository and/or an initiation received from the data health management device 300. Similarly, the processor 410 may be configured for initiating a creation of a tape backup 236 by a tape backup device 492. Once created, the processor 410 may create metadata that may be stored in the metadata repository 494 and associated with the data repository 223, the tape backup 236 and/or one or more archives 232, 234. In some cases, the project fulfillment device 410 may be used to facilitate creation of one or more archives 232, 234, such as in response to an initiation by the data health management device 410 and/or a predetermined data health management plan. In some cases, the processor may run one or more content analysis algorithms for determining metadata associated with the information to be stored within the archive 232, 234. After creation of the archive 232, 234, the processor 410 may cause the project fulfillment device 410 to communicate information about the archives 232, 234, to the archive management device 450. The information may include metadata associated with the archives 232, 234, a storage location of the archives 232, 234, a storage location for the metadata in the metadata repository 494, and/or a location of a tape backup 236 that may include the same or similar information to the information stored in the archives 232, 234. In one example, the processor 310 may be configured to operate the algorithm using a personal computing operating system, a server operating system, an open source operating system and/or an embedded operating system.

The memory 425 of the illustrative project fulfillment device 410 may communicate with the processor 420. The memory 425 may be used to store any desired information, such as instructions 427 for implementing the aforementioned control algorithm, one or more determined data health metrics, a customizable data health management plan, a predetermined data health management plan, schedule times, diagnostic limits, and/or the like. The memory 425 may be any suitable type of storage device including, but not limited to, RAM, ROM, EPROM, flash memory, a hard drive, and/or the like. In some cases, processor 420 may store information within the memory 425, and may subsequently retrieve the stored information.

The user interface 430 may be any suitable user interface that may allow the project fulfillment device 410 to display and/or solicit information, as well as accept one or more user interactions with the project fulfillment device 410. In some cases, the user interface 430 may be implemented at a location remote from the project fulfillment device 410 and may communicate to the project fulfillment device 410 via the communication interface 440 and/or the communication link 485 (e.g., a wired Ethernet network, a wireless Ethernet network, the Internet, and the like). In some cases, a common user interface 430 may be used to communicate with one or more components of the application system 220, the project fulfillment system 214, the archive management system 216, and/or the like. The user interface 430 (when provided) may permit a user to enter data such as desired data health metrics, starting times for initiating analyzing the data repository 223 for the desired data health metrics, ending times, diagnostic limits, conditions under which diagnostic limits may be suspended, responses to alerts, and the like. The user interface 430 may include one or more user interface screens 432 to facilitate interaction with a user. For example, one or more user interface screens 432 may be used to identify a data repository 223, a tape backup 236, an archive (e.g., the structured archive 232, the unstructured archive 234, etc.), or the like. In some cases, the user interface screens 432 may be used to enter and/or identify metadata 235 associated with information stored in the data repository 223, the tape backup 236, an archive (e.g., the structured archive 232, the unstructured archive 234, etc.), or the like that may be associated with the data One or more of the user interface screens 432 may be used to initiate and/or monitor the status and/or progress of a data health management project. The user interface 430 may further include a memory device 437 that may be used for storing instructions and/or data for managing the display and/or use of the user interface screens 432. In some cases, user interface 430 may include a display and a distinct keypad. A display may be any suitable display. In some instances, the display may include or may be a liquid crystal display (LCD), and in some cases a fixed segment display or a dot matrix LCD display. If desired, user interface 430 may be a touch screen LCD panel that functions as both display and keypad. In some instances, a touch screen LCD panel may be adapted to solicit values for a number of operating parameters and/or to receive such values, but this is not required.

Turning to the archive management device 450, the processor 460 may be configured to manage one or more archives and/or backups of the data repository 223, such as the structured archive 232, the unstructured archive 234 and/or the tape backup 236. For example, the processor 460 may operate in accordance with an algorithm using instructions 467 in the memory 465. In some cases, the instructions may cause the processor 460 to analyze metadata associated with an archive 232, 234 to determine whether the archive 232, 234 is a candidate for destruction. In some cases, instead of or in addition to analyzing the metadata, the processor 460 may cause the archive management device 450 to analyze the content of the archive to determine whether the archive 232, 234 is a candidate for destruction. For example, the processor 460 may be configured for analyzing at least a portion of the content stored in the archive 232, 234 against the one or more data retention policies to determine whether the archive can be deleted if none of the data retention policies are violated. If determined that the archive 232, 234 and/or tape backup 236 is a candidate for destruction, then the archive management device 450 may initiate a destruction process, such as by the data destruction system 240 of FIG. 2. In some cases, one or more portions of the data destruction system 240 may be incorporated into the archive management device 450.

In an example, the archive management device 450 may be configured to periodically determine whether one or more archives may be nearing a retention threshold. While an archive is generally discussed, a similar procedure may be used for determine whether a tape backup is at or near a data retention threshold. The retention threshold may be associated with one or more data retention policies stored in the rules repository 250. If an archive is deemed to meet and/or exceed the retention threshold, the archive is added to a candidate destruction list, or otherwise marked as a candidate for destruction. The archive management device may then collect and/or otherwise gather metadata associated with the one or more archives on the candidate destruction list. In some cases, the archive management device 450 will process the candidate destruction list with the associated metadata to determine whether to confirm destruction for each of the archives on the candidate destruction list. In other cases, the candidate destruction list may be processed within the data destruction system 240 by a computing device 245 using instructions stored in a repository 243. If confirmed, a destruction process is started for each of the confirmed archives on the data destruction list. In some cases, each archive may be automatically destroyed by a destruction algorithm processed by the computing device 245 and/or the archive management device 450. If the deletion was unsuccessful, a user may be notified and/or prompted for manual destruction of the archive, such as by using one or more screens 472 on the user interface 470. In some cases, the user interface 470 may be configured to provide a report, or other confirmation, of the success or failure of each archive destruction process.

The memory 465 of the illustrative archive management device 450 may communicate with the processor 460. The memory 465 may be used to store any desired information, such as instructions 467 for implementing the aforementioned control algorithm, one or more determined data health metrics, a customizable data health management plan, a predetermined data health management plan, schedule times, diagnostic limits, and/or the like. The memory 465 may be any suitable type of storage device including, but not limited to, RAM, ROM, EPROM, flash memory, a hard drive, and/or the like. In some cases, processor 460 may store information within the memory 465, and may subsequently retrieve the stored information.

The user interface 470 may be any suitable user interface that may allow the archive management device 450 to display and/or solicit information, as well as accept one or more user interactions with the archive management device 450. In some cases, the user interface 470 may be implemented at a location remote from the archive management device 450 and may communicate to the archive management device 450 via the communication interface 480 and/or the communication link 485 (e.g., a wired Ethernet network, a wireless Ethernet network, the Internet, and the like). In some cases, a common user interface 470 may be used to communicate with one or more components of the application system 220, the project fulfillment system 214, the archive management system 216, and/or the like. The user interface 470 (when provided) may permit a user to enter data such as desired data health metrics, starting times for initiating analyzing the data repository 223 for the desired data health metrics, ending times, diagnostic limits, conditions under which diagnostic limits may be suspended, responses to alerts, and the like. The user interface 470 may include one or more user interface screens 432 to facilitate interaction with a user. For example, one or more user interface screens 472 may be used to identify a data repository 223, a tape backup 236, an archive (e.g., the structured archive 232, the unstructured archive 234, etc.), or the like. In some cases, the user interface screens 472 may be used to enter and/or identify metadata 235 associated with information stored in the data repository 223, the tape backup 236, an archive (e.g., the structured archive 232, the unstructured archive 234, etc.), or the like that may be associated with the data One or more of the user interface screens 472 may be used to monitor the status of an archive and/or a tape backup. In other cases, one or more user interface screens may be used to initiate and/or monitor an archive destruction process. The user interface 470 may further include a memory device 477 that may be used for storing instructions and/or data for managing the display and/or use of the user interface screens 472. In some cases, user interface 470 may include a display and a distinct keypad. A display may be any suitable display. In some instances, the display may include or may be a liquid crystal display (LCD), and in some cases a fixed segment display or a dot matrix LCD display. If desired, user interface 470 may be a touch screen LCD panel that functions as both display and keypad. In some instances, a touch screen LCD panel may be adapted to solicit values for a number of operating parameters and/or to receive such values, but this is not required.

Figure 5:
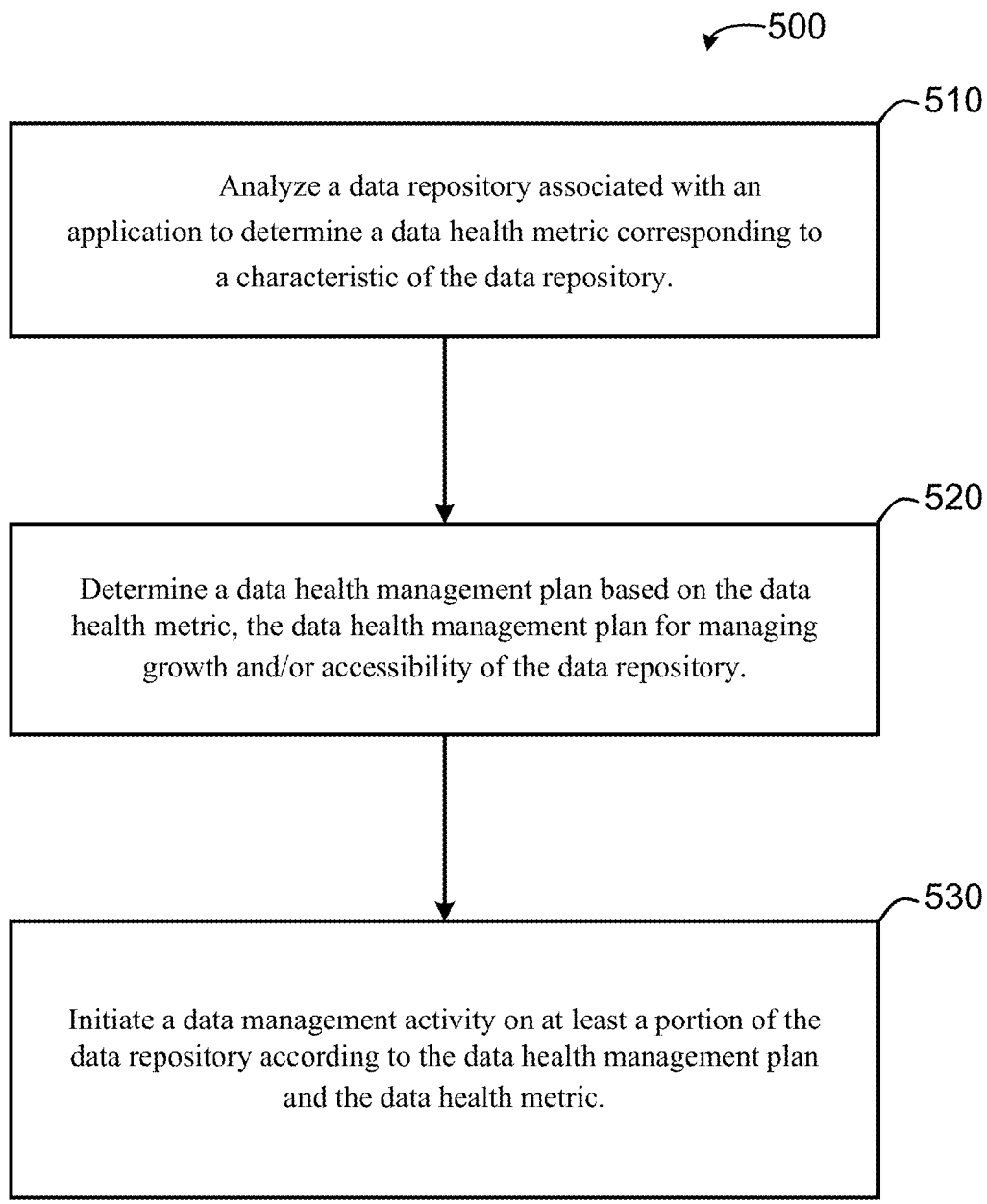
FIG. 5 is a flowchart of an illustrative method for determining at least one data health metric for data associated with the one or more applications of FIG. 2 according to one or more aspects of the present disclosure.

FIG. 5 is a flowchart of an illustrative method for determining at least one data health metric for data associated with the one or more applications of FIG. 2 according to one or more aspects of the present disclosure. At 510, a computing device 101 (e.g., the data health management device 300), may analyze the data repository 223 associated with the application 222 to determine a data health metric corresponding to a characteristic of the data repository 223. In some cases, the data health metric may correspond to one or more metadata items (e.g., a size, an access time, a utilization rate, a central processor unit (CPU) user percentage, and the like), as shown in Table 1. At 520, the computing device 101 may determine a data health management plan based on the data health metric. In some cases, the data health management plan may be used to manage growth and/or accessibility of the data repository 223. At 530, the computing device 101 may initiate a data management activity on at least a portion of the data repository 223 based on the data health management plan and the data health metric. For example, the computing device 101 may initiate a compression of the data repository, a removal and/or redaction of private and/or confidential data from the data repository, a creation of a tape backup 236, and/or a creation and/or destruction of an archive 232, 234. In some cases, the computing device 101 may be configured for monitoring the initiated data management activity performed on the data repository 223 and providing an indication of whether the data management activity completed successfully and providing the indication to a user, such as via a user interface screen 332, a printed report, and/or another visual or audible indication. In some cases, the data management activity may include determining metadata corresponding to the data repository 223 and/or the application 222 associated with the data repository 223 and associating the determined metadata with the data repository.

Figure 6:
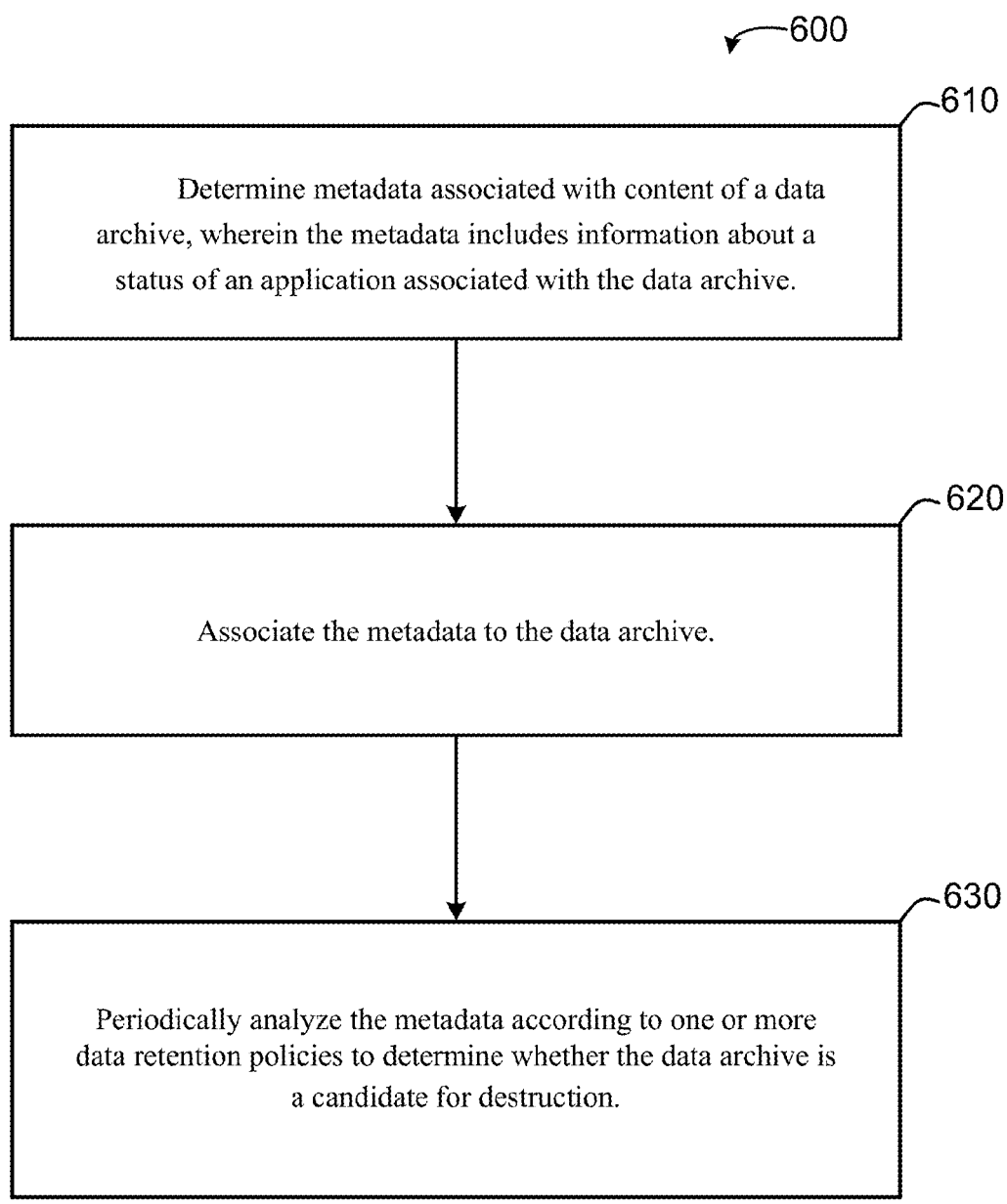
FIG. 6 is a flowchart of an illustrative method for managing data associated with the one or more applications of FIG. 2 according to one or more aspects of the present disclosure.
Figure 7:
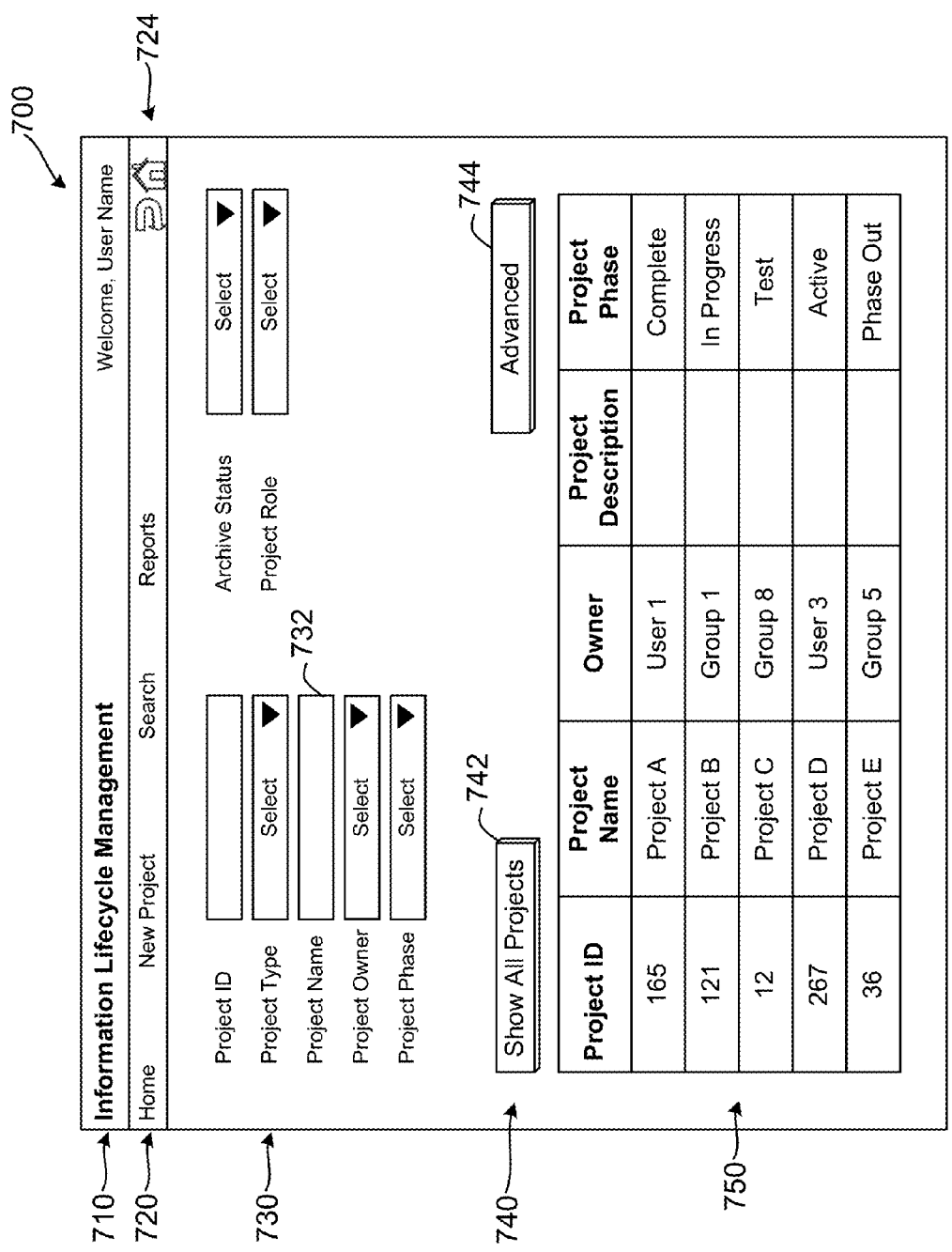
FIG. 7 shows an illustrative user interface screen to facilitate operation of the data health management apparatus of FIGS. 2 and 3.
Figure 8:
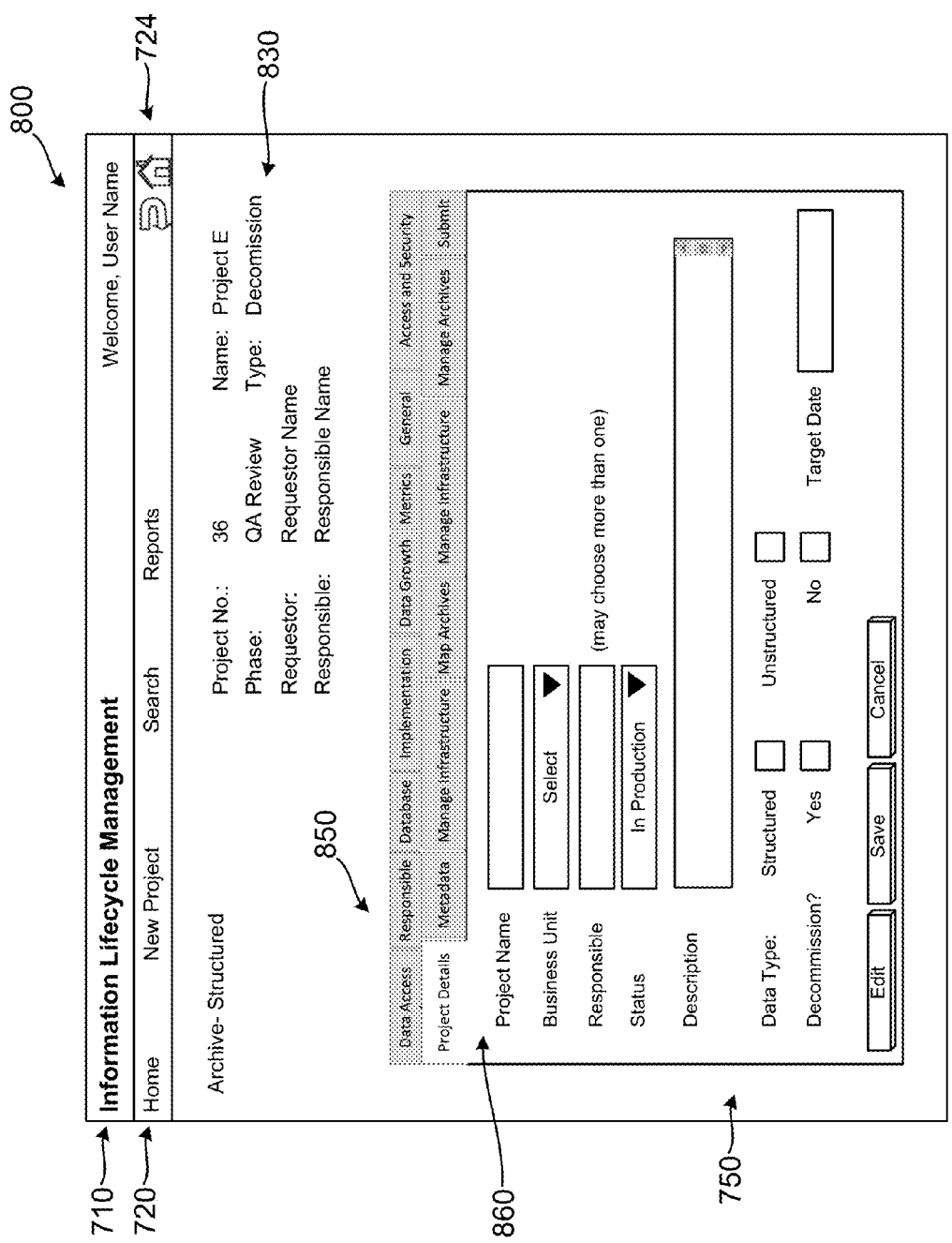
FIGS. 8-10 show illustrative user interface screens that facilitate operation of the data management apparatus of FIGS. 2 and 4.
Figure 9:
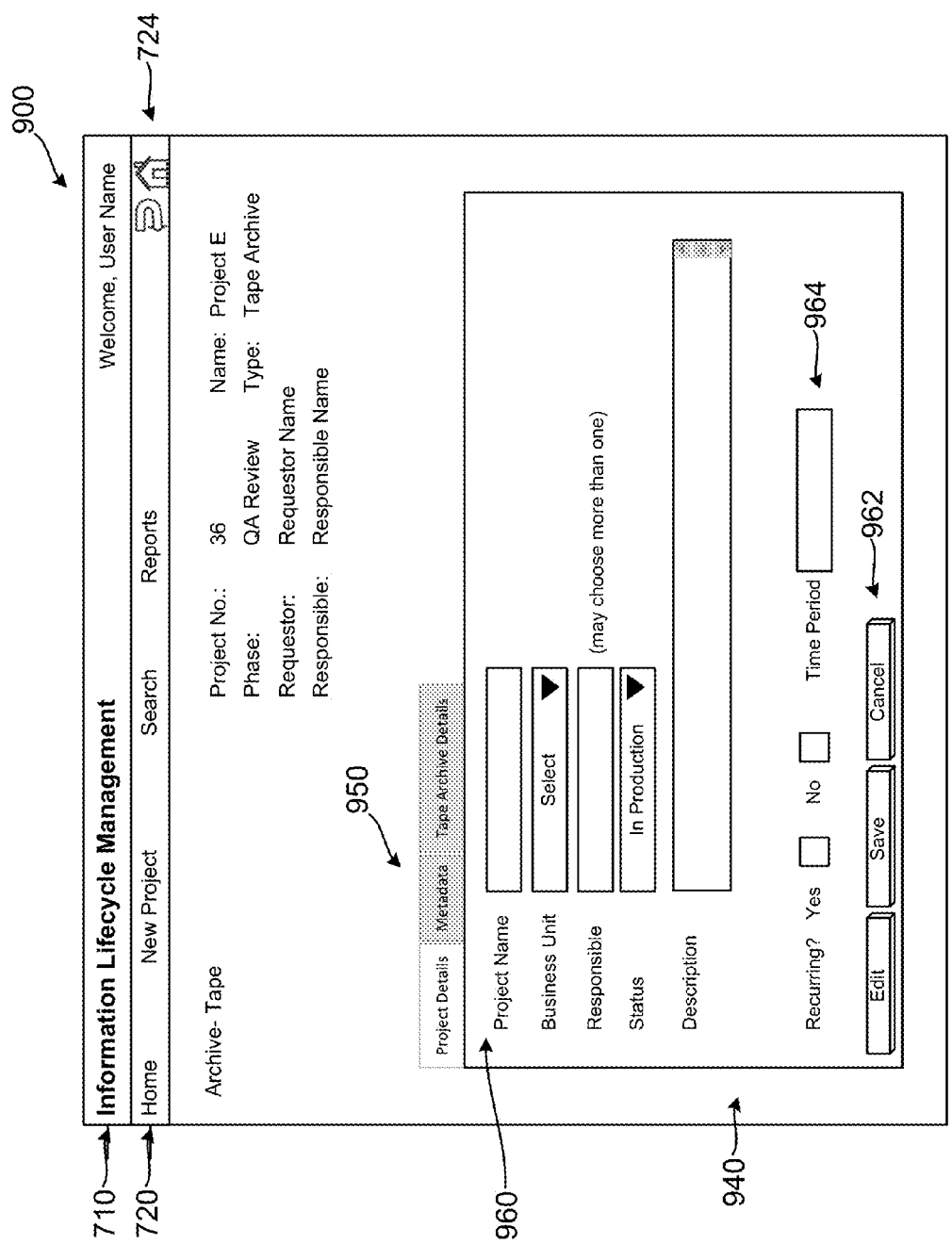
Figure 10:
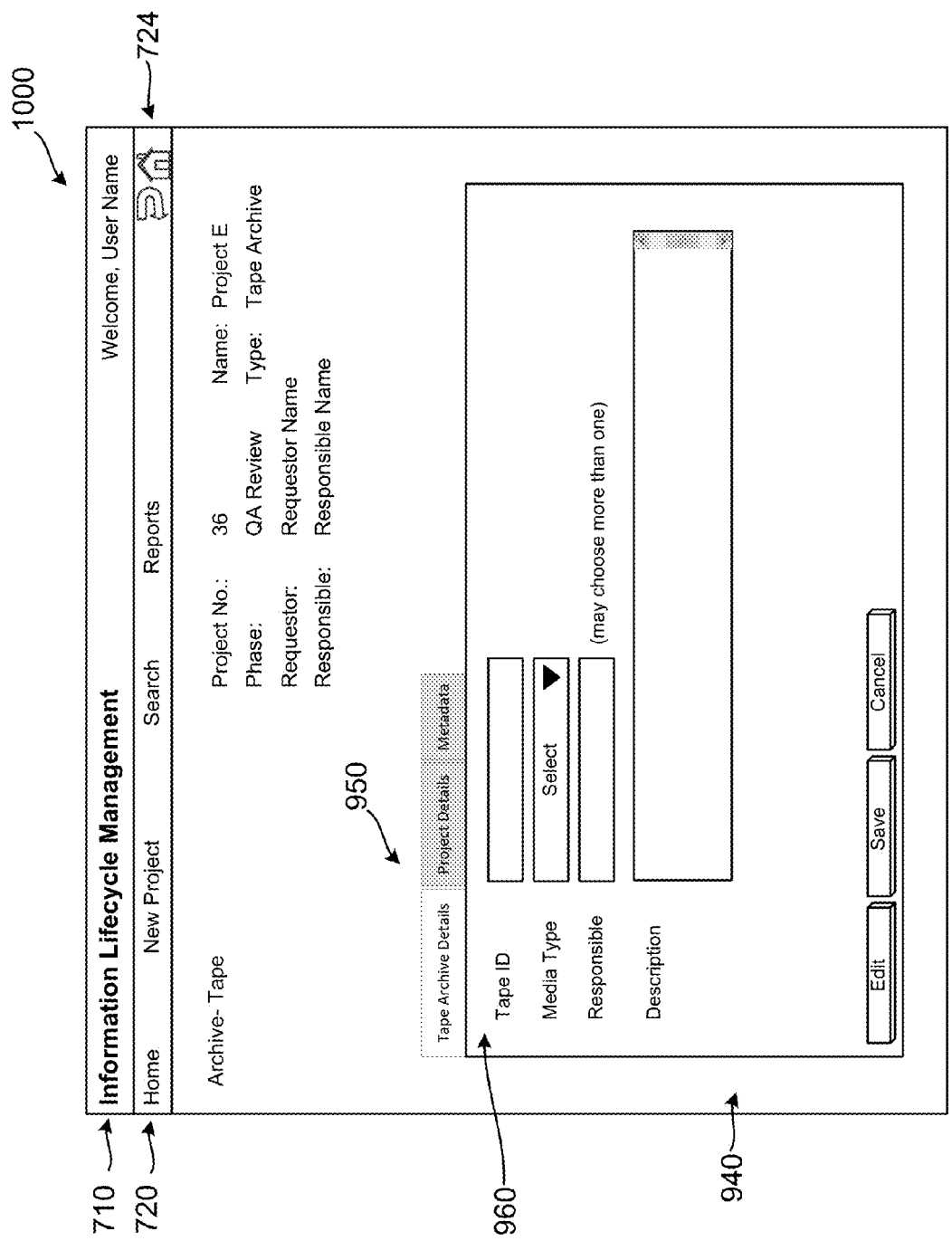

FIG. 6 is a flowchart of an illustrative method for managing archives 232, 234 or backups (e.g., the tape backup 236) associated with the one or more applications of FIG. 2. At 610, the computing device 101 (e.g., the project fulfillment device 410, the archive management device 450, and the like), may determine metadata associated with content of the data archive 232, 234 or tape backup 236, wherein the metadata includes information about a status of an application 222 associated with the data archive 232, 234 or the tape backup 236. At 620, the computing device associates the metadata to the data archive 232, 234 and/or with the tape backup 236. At 630, the computing device 101 periodically, with or without initiation from an external source (e.g., a user, the data health management device 300, and the like), analyzes the metadata according to one or more data retention policies that may be stored in the rule repository 250 to determine whether the data archive 232, 234 and/or the tape backup 236 is a candidate for destruction. For example, the computing device 101 may analyze at least a portion of the content stored in the archive 232, 234, and/or the tape backup 236 against the one or more data retention policies to determine whether the archive can be deleted if none of the data retention policies are violated. In some cases, the computing device 101 may analyze the content of a data repository 223 to determine the metadata. In some cases, the computing device 101 may generate the one or more of the data archive 232, 234 and/or the tape backup 236 using data stored within the data repository 223 associated with the application 222. For example, the computing device may generate a structured data archive using structured data stored in the data repository, generate an unstructured data archive using unstructured data stored in the data repository and/or initiate the create of the tape backup 236, such as by the tape backup device 492. In some cases, the computing device 101 may be configured to initiate the destruction of the archive 232, 234 and/or the tape backup 236, when the archive 232, 234 and/or the tape backup 236 does not violate any of the one or more data retention polices and/or regulates that may be stored in the rules repository 250.

FIGS. 7-10 show illustrative user interface screens to facilitate operation of the information management system 210. For example, the illustrative screens may include a title field 710 that may include information, navigation buttons 724, and/or menu items (not shown) to allow a user to more easily navigate and/or interact with the components of the information management system 210, such as the data health management device 300, the project fulfillment device 410, and/or the archive management device 450. An entry field 730 may be used to facilitate entry of one or more attributes of a data management project using one or more data entry boxes 732. For example, within the entry field, a user may enter a number of project attributes used to manage and/or track a data management project, such as a data health management project, a data repository management project (e.g., a backup, a compression, a redaction) or the like. Illustrative project data may include a project ID, a project type (e.g., data management, data compression, archive deletion, archive creation, backup creation, metadata creation, or the like), a project name, a project owner, a project role (e.g., owner, responsible, tester, and the like), a project phase (e.g., initiation, monitoring, phase out, or the like). Where applicable, a user may enter a status of one or more archives associated with the project. The screen 700 may include one or more buttons 740 to facilitate the display and/or entry of the project information. For example, a first button 742 may be used to facilitate quick display status information about one or more projects. A second button 744 (e.g., the "advanced" button) may be provided to facilitate entry and/or display of more detailed information about the project, including metadata associated with the project, data retention policies applicable to the project, and the like. In the display field 750, information about one or more project may be displayed, such as in a grid, graphically, a text-based list, or the like. For example, the display field 750 may display a project ID, a project name, an owner, a project description and/or a project phase for one or more projects.

User interface screen 800 may be used to display information about an archive, such as the structured archive 232 and/or the unstructured archive 234. For example, the screen 800 may include a project display field 830 for displaying information about a project associated with one or more particular archives 232, 234 and/or tape backups 236. For example, the project information may include a project phase (e.g., a quality assurance review phase, and the like), and/or a project type (e.g., a creation phase, a decommission phase, or the like). In some case, the display field 750 may include a tabular display window 850 for displaying and/or facilitating user entry of project information. For example, the tabular display window may include tabs for entering and/or displaying information about the associated project 860, the associated metadata, for managing hardware and/or software infrastructure associated with the archives and/or tape backups, a map any associated archives, for managing the archives, and/or for mapping the hardware and/or software infrastructure. In some cases, the tabular display window 850 may include information about data access to the archives, who is responsible for one or more portions of the archives (e.g., individuals, business units, and the like), about the implementation of the archive, about growth of the archive and/or the associated data repository 223, for setting access and/or security rights, for entry of other general information and/or for submitting information either to the archive and/or to the project information about the archive.

Screens 900 and 1000 may be used to display information associated with one or more tape backups 236. For example, the screen 900 may include a project detail tab 960 for displaying and/or facilitating entry of project information associated with one or more particular tape backups, such as by using the buttons 962. For example, a user may enter a project name, an associated business unit, a responsible party (e.g., a person, a business unit, and the like), a status of the project (e.g., in development, in testing, in production, in phase out, end of life), and/or a description of the project and/or the one or more tape backups. In some cases, the screen 800 may allow a user to create a reoccurring project, such as for creating a tape backup at a predetermined interval by using one or more entry fields 964 to specify whether to create backups at a predetermined time interval (e.g., weekly, daily, monthly, yearly, or the like). In some cases a user may select a tab 950 to display a different tab, such as the tape archive detail tab 1060. Here a user may enter and/or display information associated with a tape backup, such as an identification of the tape (e.g., the tape ID) a media type (e.g., a tape, a disk, a flash drive, or the like), a responsible person and/or business group, and/or a description about the tape Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects. For example, a computer-readable medium storing instructions to cause a processor to perform methods in accordance with aspects of the disclosure is contemplated.

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. An apparatus comprising:
   a non-transitory memory; and
   a processor communicatively coupled to the memory, the processor configured to process instructions read from the memory, wherein the instructions cause the processor to:
   identify data associated with an application, the data stored in at least one data repository and the data being associated with metadata comprising at least a record identifier and an application identifier;
   identify the metadata associated with the data repository, the metadata comprising at least information associated with a size of the data repository and an indication of whether or not data has been redacted or removed from the data repository;
   analyze, via a network, the data stored in the at least one data repository to determine at least one data health metric, wherein the at least one data health metric corresponds to the metadata associated with the data repository and wherein the at least one data health metric includes an application status metric comprising an indication of a phase of a lifecycle of the application; and
   determine an action associated with a data health management plan to be performed on the data repository based on the determined data health metric including the phase of the application lifecycle, wherein the action is determined from a group of actions associated with the data health management plan, the group of actions comprising at least compression of the data repository, a removal and/or redaction of confidential data, a creation of an archive, and a destruction of an archive;
   monitor metadata associated with the archive;
   compare the metadata to one or more data retention rules;
   based on the data retention rules, initiate an automated destruction procedure of the archive;
   determine if one or more of the data records associated with the archive are subject to a data retention policy comprising a legal hold; and
   communicate, via a network, a failure in the destruction procedure of the archive when one or more of the data records associated with the archive are subject to the data retention policy comprising a legal hold.

2. The apparatus of claim 1, wherein the instructions stored in the memory further cause the processor to initiate the action to be performed on the data repository and to provide information about the action to a user.

3. The apparatus of claim 1, wherein the action includes scrubbing the data stored in the data repository based on a data privacy policy.

4. The apparatus of claim 1, wherein the action includes compressing the size of the data repository.

5. The apparatus of claim 1, wherein the action includes archiving at least a portion of the data repository.

6. The apparatus of claim 5, wherein archiving includes at least one of creating a structured archive and creating an unstructured archive.

7. The apparatus of claim 1, further comprising a user interface configured to receive information about the data repository and to provide an indication of the data health metric to a user.

8. The apparatus of claim 7, wherein the user interface includes at least one screen to allow a user to input information about the at least one data repository and/or the application associated with the data repository.

9. The apparatus of claim 7, wherein the user interface includes at least one screen for providing a graphical representation of the data health metric.

10. The apparatus of claim 1, wherein the data health metric includes a hardware health metric corresponding to the health of a hardware device associated with the at least one data repository and/or a software health metric corresponding to the health of a software application used to implement the data repository on the hardware device.

11. A system for managing a data repository, the system comprising:
  a user interface having at least a first screen for receiving information about an application having a data repository;
  a data health computer communicatively coupled to the user interface, the data health computer including a non-transitory memory and a processor communicatively coupled to the memory, the processor configured to process instructions that cause the data health computer to:
    identify the data repository associated with the application, wherein the data repository is associated with metadata comprising at least an application identifier and a record identifier;
    identify the metadata associated with the data repository, the metadata comprising at least information associated with a size of the data repository and an indication of whether or not data has been redacted or removed from the data repository
    determine at least one data health metric associated with the data repository based at least in part on the metadata; and
    initiate a data management activity on the data repository based on the at least one data health metric, wherein the data management activity is selected from a group of actions comprising at least compression of the data repository, a removal and/or redaction of confidential data, a creation of an archive, and a destruction of an archive; and
    monitor metadata associated with the archive;
    compare the metadata to one or more data retention rules; and
    based on the data retention rules, initiate an automated destruction procedure of the archive; and
    determine if one or more of the data records associated with the archive are subject to a data retention policy comprising a legal hold; and
    communicate, via a user interface device, a failure in the destruction procedure of the archive based on the legal hold.

12. The system of claim 11, wherein the at least one data health metric includes a data repository size and the data management activity includes compressing the data repository when the data repository size is greater than or equal to a specified data compression threshold value.

13. The system of claim 11, wherein the at least one data health metric includes determining an application status and wherein the data management activity includes creating an archive of at least a portion of the data repository based on the application status.

14. The system of claim 11, further including a data archive tool communicatively coupled to the data repository and the data health computer, wherein the data archive tool includes a processor configured to create an archive of at least a portion of the data repository when initiated by the data health computer.

15. A computer-assisted method for managing a data repository, the method comprising:
  analyzing, by a computer, a data repository associated with an application to determine a data health metric corresponding to a characteristic of the data repository, wherein the characteristic of the data repository includes metadata associated with the data repository;
  determining a data health management plan based on the data health metric, the data health management plan for managing growth and/or accessibility of the data repository and includes redaction or removal of confidential information;
  initiating a data management activity on at least a portion of the data repository according to the data health management plan and the data health metric;
  monitoring metadata associated with the archive;
  compare the metadata to one or more data retention rules; and
  based on the data retention rules, initiate an automated destruction procedure of the archive; and
  determine if one or more of the data records associated with the archive are subject to a data retention policy comprising a legal hold; and
  communicate, via a network, a failure in the destruction procedure of the archive based on the legal hold.

16. The method of claim 15, further comprising monitoring the initiated data management activity performed on the data repository and providing an indication of whether the data management activity completed successfully and providing the indication to a user via a user interface.

17. The method of claim 15, wherein the data management activity comprises scrubbing private data from the data repository based on one or more data privacy rules.

18. The method of claim 15, wherein the data management activity comprises determining the metadata corresponding to the data repository and/or to the application associated with the data repository and associating the determined metadata with the data repository.

19. The method of claim 15, wherein the data management activity comprises creating an archive of at least a portion of the data repository.

* * * * *